US009437226B1

United States Patent
Koba et al.

(10) Patent No.: US 9,437,226 B1
(45) Date of Patent: Sep. 6, 2016

(54) METHOD OF TESTING THERMALLY-ASSISTED MAGNETIC HEAD

(71) Applicant: SAE Magnetics (H.K.) Ltd., Hong Kong (CN)

(72) Inventors: Tadatoshi Koba, Hong Kong (CN); Seiichi Takayama, Hong Kong (CN); Ryuji Fujii, Hong Kong (CN); Takashi Honda, Hong Kong (CN); Osamu Harakawa, Hong Kong (CN); Masahiro Kuribayashi, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 14/710,735

(22) Filed: May 13, 2015

(51) Int. Cl.
| | |
|---|---|
| *G11B 5/455* | (2006.01) |
| *G11B 5/127* | (2006.01) |
| *G11B 5/00* | (2006.01) |
| *G11B 5/60* | (2006.01) |
| *G11B 5/012* | (2006.01) |

(52) U.S. Cl.
CPC ............... *G11B 5/455* (2013.01); *G11B 5/127* (2013.01); *G11B 5/012* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,393,074 B1 | 3/2013 | Takayama et al. | |
| 2011/0228650 A1 | 9/2011 | Shimazawa et al. | |
| 2012/0163137 A1* | 6/2012 | Wang | G11B 5/3166 369/13.02 |

\* cited by examiner

*Primary Examiner* — Brian Butcher
(74) *Attorney, Agent, or Firm* — Nixon & Vanderhye PC

(57) ABSTRACT

A method of testing a TAMH includes providing a slider body having a waveguide embedded therein with an incidence end extending toward a back surface of the slider body; providing a light source unit including a light source and a unit substrate; coating a bonding material layer on the back surface, under the bottom, or both on the back surface and under the bottom of the unit substrate; coating a localization material layer on the back surface; aligning the light source unit to the slider body; causing a light emitted from the light source and allowed to be incident on the incidence end to anneal the localization material layer to generate an annealing mark; removing the light source unit or the light source from the slider body; and measuring a position offset between the annealing mark and the incidence end. The method can evaluate alignment accuracy of a slider body and a light source unit in two dimensional directions.

10 Claims, 11 Drawing Sheets

US 9,437,226 B1

METHOD OF TESTING THERMALLY-ASSISTED MAGNETIC HEAD

FIELD OF THE INVENTION

The present invention relates to a hard disk drive (HDD) with a thermally-assisted magnetic head (TAMH) and, more particularly, to a method of testing a TAMH.

BACKGROUND OF THE INVENTION

As the recording density of a magnetic recording device, as represented by a disk drive unit, becomes higher, further improvement has been required in the performance of a magnetic head and a magnetic recording medium, especially, in the magnetic recording medium. To increase the recording density of a magnetic recording device, it is necessary to decrease the size of the magnetic fine particles that constitute the magnetic recording medium. Making the magnetic fine particles smaller, however, causes the problem that the magnetic fine particles drop in the thermal stability of magnetization.

To solve this problem, it is effective to increase the anisotropic energy of the magnetic fine particles. However, increasing the anisotropic energy of the magnetic fine particles leads to an increase in anisotropic magnetic field (high coercivity) of the magnetic recording medium. As a result, the magnetic head cannot write data to the magnetic recording medium when the anisotropic magnetic field of the medium exceeds the write field limit.

Recently, as a method for solving the problem of thermal stability, so-called a thermally-assisted magnetic recording (TAMR) technique is proposed. In the technique, a magnetic recording medium formed of a magnetic material with a high coercivity is used so as to stabilize the magnetization, then anisotropic magnetic field of a portion of the medium, where data is to be written, is reduced by heating the portion; just after that, writing is performed by applying write field to the heated portion. The area where data is written subsequently falls in temperature and rises in anisotropic magnetic field to increase the thermal stability of magnetization. Hereinafter, a magnetic head for use in TAMR will be referred to as a thermally-assisted magnetic head (TAMH).

In this TAMR technique, there has been generally used a method in which a magnetic recording medium is irradiated and thus heated with a light such as near-field light. A known method for generating near-field light is to use a plasmon generator, which is a piece of metal that generates near-field light from plasmons excited by irradiation with light. The light for use to generate near-field light is typically guided through a waveguide, which is provided in the slider, to the plasmon generator disposed near the medium facing surface, that is, a surface of the slider that faces the magnetic recording medium.

To supply the light for use to generate near-field light to the waveguide, a laser diode may be secured to the slider to allow laser light emitted from the laser diode to be incident on the incidence end of the waveguide provided in the slider, as disclosed in U.S. Patent Application Publication No. 2011/0228650 A1, for example.

U.S. Patent Application Publication No. 2011/0228650 A1 discloses a thermally-assisted magnetic recording head including a slider having a waveguide, and a light source unit. The light source unit includes a laser diode and a unit substrate for supporting the laser diode. The unit substrate is bonded to the slider, being positioned so that emitted light from the laser diode will be incident on the incidence end of the waveguide. Solder, for example, is used to bond the unit substrate to the slider.

In the process of manufacturing the thermally-assisted magnetic recording head including the laser diode, the unit substrate and the slider as described above, it is important that the unit substrate be accurately positioned with respect to the slider so that emitted light from the laser diode will be accurately incident on the incidence end of the waveguide.

U.S. Patent Application Publication No. 2011/0228650 A1 discloses a positioning method that allows the unit substrate to be positioned with respect to the slider in the following manner. In the positioning method, emitted light from the laser diode is allowed to be incident on the incidence end of the waveguide, the intensity of light emitted from the emitting end of the waveguide is detected, and the unit substrate is positioned with respect to the slider so that the aforementioned intensity becomes the maximum.

While, the method of positioning the unit substrate with respect to the slider by the light intensity just search a light intensity peak position, but can not provide us the actual alignment position information, that is, the actual alignment position can not be evaluated.

Therefore, a cross section surface observation method is provided to evaluate alignment position of the bonded sample of a slider 22' and a light source unit 24', referring to FIGS. 1 to 4. Concretely, FIG. 1 and FIG. 2 show a horizontal direction cross section view of the slider 22' and the light source unit 24', an position offset X1' can be evaluated according to the positions of the centerline L1' of a laser diode stripe 2422' of a light source 242' and the centerline L2' of the waveguide 222' embedded in the slider 22' at a horizontal direction, that is, this method just can evaluate the actual alignment position thereof in the horizontal direction, but can not provide us the actual alignment position in a perpendicular direction at the same time. To the contrary, FIG. 3 and FIG. 4 show a perpendicular direction cross section view of the slider 22' and the light source unit 24', which just can evaluate the actual alignment position thereof in the perpendicular direction, but can not provide us the actual alignment position thereof in the horizontal direction at the same time. Namely, cross section surface observation method just can evaluate alignment accuracy in one dimensional direction, but not in two dimensional directions. In addition, the cross section surface observation method was the only way to evaluate the accuracy of the alignment position so far. But it takes long time to prepare the samples and machine. Therefore, we could not evaluate lots of samples' alignment accuracy at the same time.

In the method of performing thermally-assisted magnetic recording, it is important to stably supply light with sufficient intensity to a desired position on the magnetic recording medium. Therefore, it is necessary to secure high alignment accuracy for fixing a light source unit to a slider. Reduction in alignment accuracy causes reduction in heating efficiency with respect to a magnetic recording medium, and it is serious issue in thermally-assisted magnetic recording. From the reason, it is desirable to provide a method capable of easily and accurately testing and manufacturing a thermally-assisted magnetic recording head excellent in write efficiency. Hence, it is desired to provide a method of testing a TAMH to overcome the above-mentioned drawbacks.

SUMMARY OF THE INVENTION

One objective of the present invention is to provide a method of testing a thermally-assisted magnetic head (TAMH), which can evaluate alignment accuracy of a slider body and a light source unit in two dimensional directions.

The above objective is achieved by providing a method of testing a TAMH, the method includes providing a slider body having a waveguide embedded therein with an incidence end extending toward a back surface of the slider body; providing a light source unit including a light source and a unit substrate for supporting the light source; coating a bonding material layer on the back surface, under the bottom, or both on the back surface and under the bottom of the unit substrate; coating a localization material layer on the back surface to cover the incidence end of the waveguide; aligning the light source unit to the slider body; causing a light emitted from the light source and allowed to be incident on the incidence end of the waveguide to anneal the localization material layer to generate an annealing mark; removing the light source unit or the light source from the slider body; and measuring a position offset between the annealing mark of the localization material layer and the incidence end of the waveguide.

Preferably, the method of testing a TAMH further includes melting the bonding material layer and then bonding the slider body and the light source unit after aligning the light source unit to the slider body.

Concretely, the bonding material layer is made of a material selected from a group consisting of tin, tin alloy, indium, indium alloy, lead alloy and bismuth alloy.

Concretely, the localization material layer is made of a material selected from a group consisting of tin, tin alloy, indium, indium alloy, lead alloy and bismuth alloy.

Preferably, the light source is a laser diode or a light emitting diode.

Preferably, the method of removing the light source unit or the light source includes cutting, pulling, grinding, lapping or polishing.

Preferably, the thickness of the localization material layer is in a range of 10 angstrom to 10000 angstrom.

Preferably, the localization material layer covers the entire back surface of the slider body.

Preferably, a current supplied to the light source unit for generating the light to anneal the localization material layer is in a range of 10 milliamperes to 200 milliamperes.

A method of manufacturing a thermally-assisted magnetic head includes providing a slider body having a waveguide embedded therein with an incidence end extending toward a back surface of the slider body; providing a light source unit including a light source and a unit substrate for supporting the light source; coating a bonding material layer on the back surface, under the bottom, or both on the back surface and under the bottom of the unit substrate; coating a localization material layer on the back surface to cover the incidence end of the waveguide; aligning the light source unit to the slider body; causing a light emitted from the light source and allowed to be incident on the incidence end of the waveguide to anneal the localization material layer to generate an annealing mark; removing the light source unit or the light source from the slider body; measuring a position offset between the annealing mark of the localization material layer and the incidence end of the waveguide; and making a position correction to the positions between the light source unit and the slider body according to the position offset.

In comparison with the prior art, the method coats a localization material layer on a back surface of a slider body, and then anneals the localization material layer by a light source to generate an annealing mark on the slider body. In such a way, a position offset between the annealing mark of the localization material layer and the incidence end of the waveguide can be measured, whereby a position correction between a light source unit and a slider body in two dimensional directions can be made during the alignment process in the manufacturing method, and thus the alignment accuracy between the slider body and the light source unit can be improved, in turns the performance of the TAMH is improved. In addition, the samples and machine used in this method are easy to prepare, and the TAMH can be tested in row bar level, thereby achieving a batch test to save the testing and measuring time.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
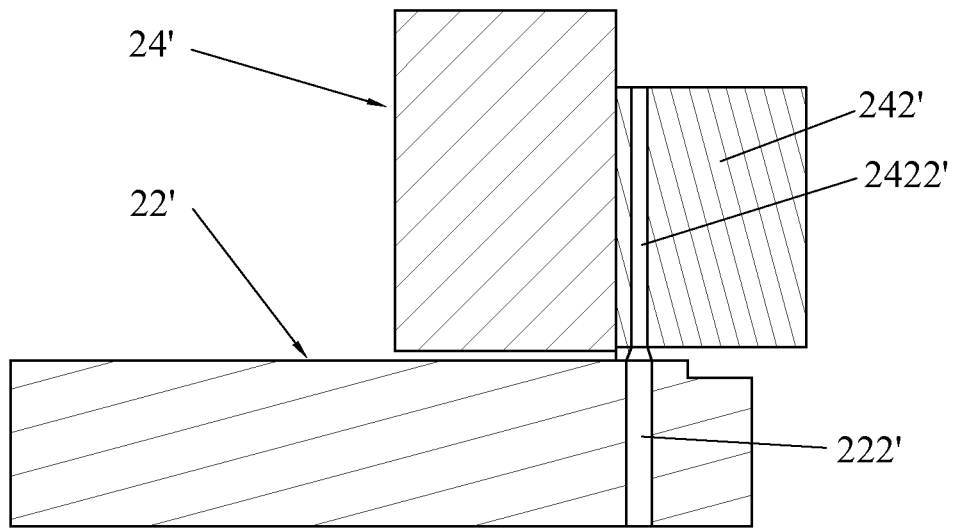
FIG. 1 shows a cross section view of a slider and a light source unit in horizontal direction.
Figure 2:
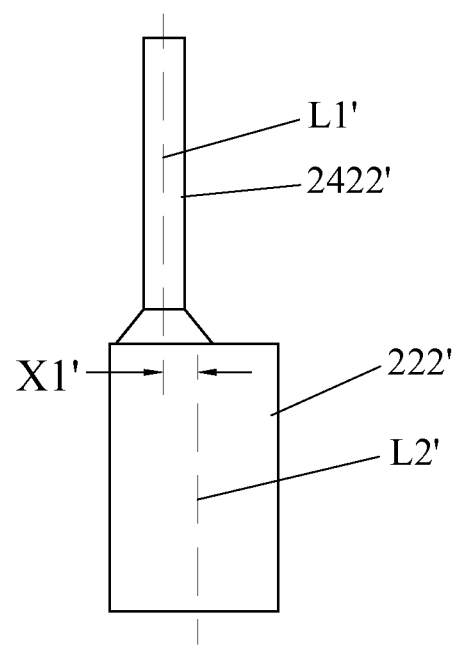
FIG. 2 is a enlarged view of a laser diode stripe and a waveguide in FIG. 1.
Figure 3:
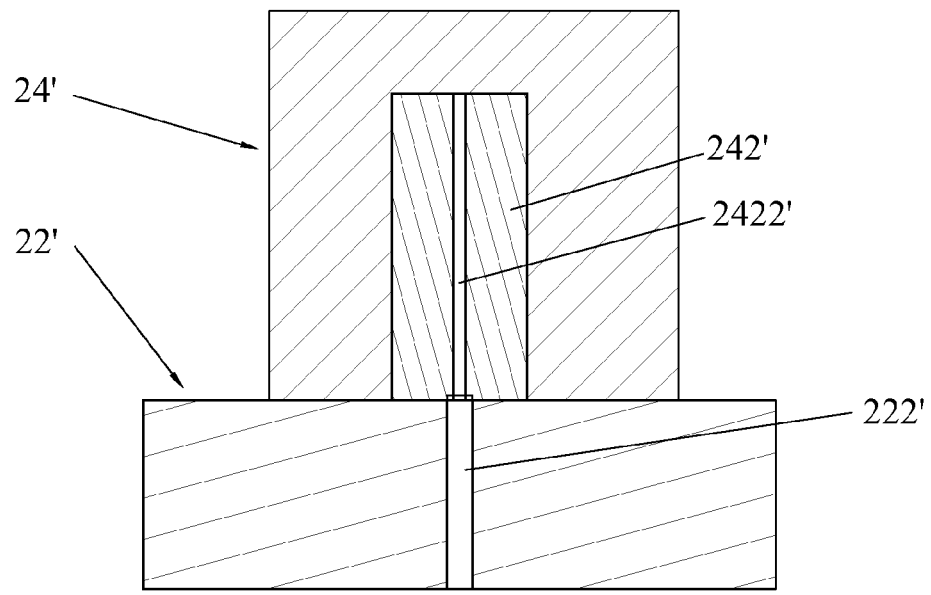
FIG. 3 shows a cross section view of a slider and a light source unit in perpendicular direction.
Figure 4:
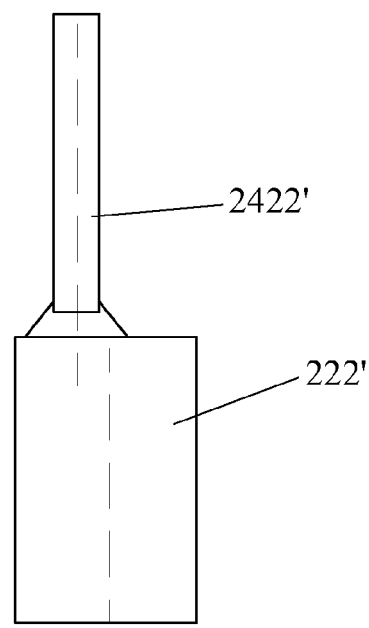
FIG. 4 is a enlarged view of a laser diode stripe and a waveguide in FIG. 3.

Various preferred embodiments of the invention will now be described with reference to the figures, wherein like reference numerals designate similar parts throughout the various views. As indicated above, the present invention is directed to a method of testing a thermally-assisted magnetic head (TAMH), thereby alignment accuracy of a slider body and a light source unit in two dimensional directions can be evaluated.

Figure 5:
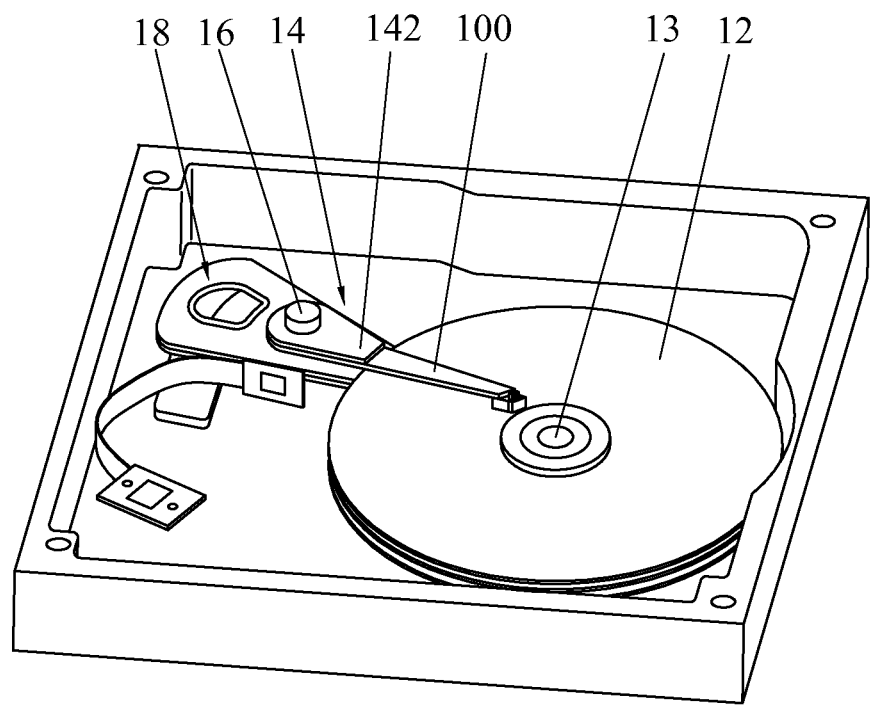
FIG. 5 is a perspective view of a hard disk drive with thermally-assisted magnetic heads according to one embodiment of the present invention.

FIG. 5 is a perspective view of a disk drive unit of the present invention. As shown, a disk drive unit 1 contains a number of rotatable magnetic disks 12 attached to a spindle motor 13, and a head stack assembly (HSA) 14 which is rotatable about an actuator arm axis 16 for accessing data tracks on the magnetic disks 12 during seeking. The magnetic disk 12 is a type of magnetic recording medium. The HSA 14 contains a set of drive arms 142 and HGAs 100 mounted on the ends of the drive arms 142. Typically, a spindling voice-coil motor (VCM) 18 is provided for controlling the motion of the drive arm 142.

Figure 6:
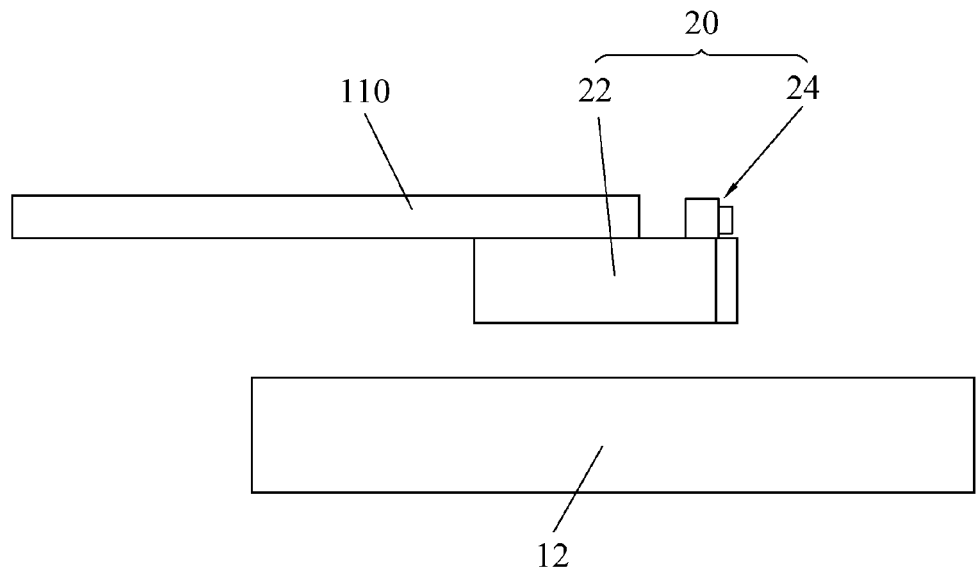
FIG. 6 is a schematic view of a magnetic disk and a head gimbal assembly with a thermally-assisted magnetic head according to one embodiment of the present invention.

Referring to FIGS. 5 and 6, the HGA 100 contains a TAMH 20 and a suspension 110 supporting the TAMH 20. When the hard disk drive 1 is on, the spindle motor 13 will rotate the magnetic disk 12 at a high speed, and the TAMH 20 will fly above the magnetic disk 12 due to the air pressure drawn by the rotated magnetic disk 12. The TAMH 20 moves across the surface of the magnetic disk 12 in the radius direction under the control of the VCM 18. With a different track, the TAMH 20 can read data from or write data to the magnetic disk 12. Concretely, the magnetic disk 12 has high recording density, and the TAMH 20 write data to the magnetic disk 12 by a thermally-assisted magnetic recording (TAMR) technique.

Figure 7:
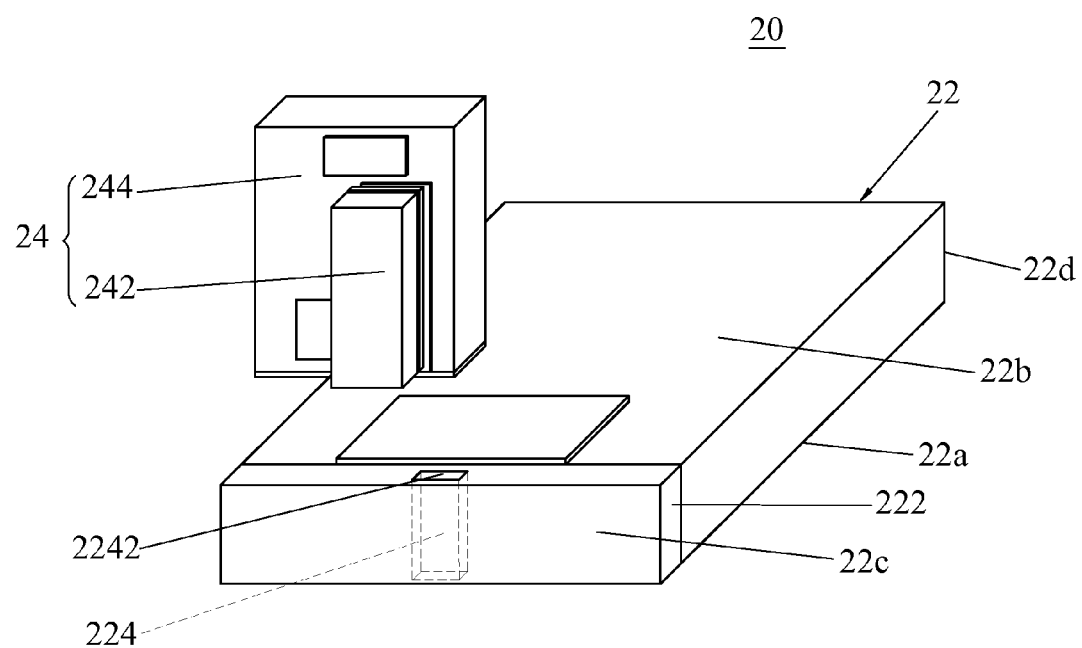
FIG. 7 is a perspective view of a thermally-assisted magnetic head according to one embodiment of the present invention.
Figure 8:
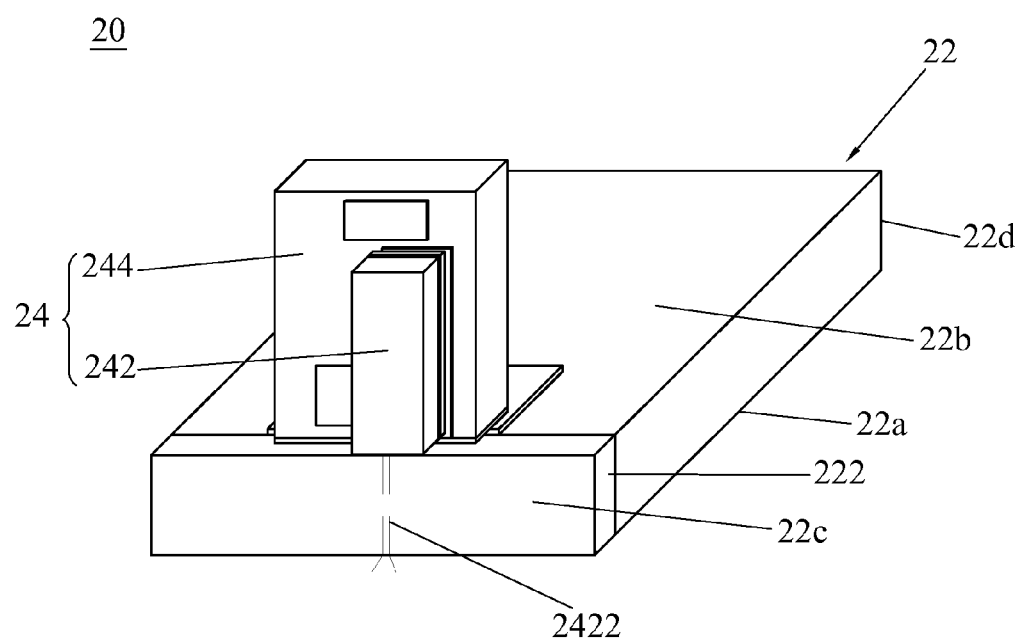
FIG. 8 is another perspective view of a thermally-assisted magnetic head according to one embodiment of the present invention.

Referring to FIGS. 7 and 8, the TAMH 20 according to the present invention is illustrated. The TAMH 20 includes a slider body 22 and a light source unit 24 formed on the slider body 22 for thermally assisted magnetic recording. The light source unit 24 includes a light source 242 and a unit substrate 244 for supporting the light source 242. In the present embodiment, the slider body 22, the light source 242, and the unit substrate 244 are generally rectangular shaped.

As shown, the slider body 22 has an ABS 22a, a back surface 22b opposite to the ABS 22a, a trailing edge 22c, a leading edge 22d opposite to the trailing edge 22c, and two side surfaces (not labeled). The ABS 22a facing to the magnetic disk 12 is processed so as to provide an appropriate flying height, and a thermally-assisted magnetic head section 222 is formed on the trailing edge 22c. The trailing edge 22c has multiple bonding pads (not shown) to connect with the suspension 110 of the HGA 100. Specifically, the light source unit 24 is mounted on the back surface 22b, and a waveguide 224 embedded in the thermally-assisted magnetic head section 222 has an exit end (not shown) extending toward the ABS 22a and an incidence end 2242 extending toward the back surface 22b for transmitting a light 2422 generated from the light source 242 to the surface of the magnetic disk 12 to facilitate writing.

Preferably, a plasmon generator (not shown) is disposed near the ABS 22a, which generates near-field light from plasmons excited by irradiation with light 2422. The light 2422 for use to generate near-field light is guided through the waveguide 224, and the near-field light is used to irradiate and then heat the magnetic disk 12 with high recording density, and then writing is performed by a write pole (not shown) to the heated portion. By the way, a TAMH 20 without the plasmon generator also can heat the magnetic disk 12 by the light 2422 guided through the waveguide 224 directly.

Figure 9:
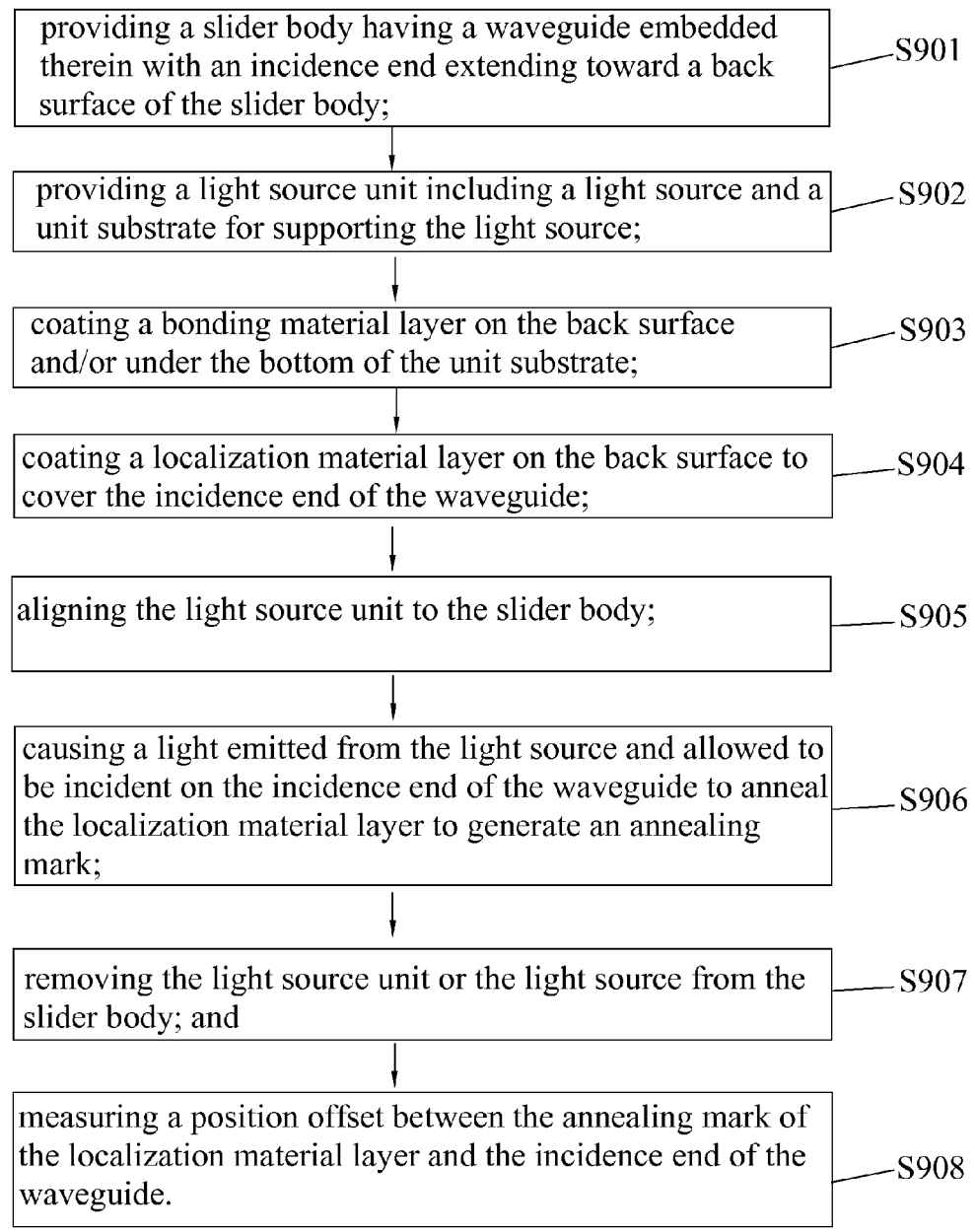
FIG. 9 is a flowchart of a method of testing a thermally-assisted magnetic head according to one embodiment of the present invention.

FIG. 9 shows a simplified flowchart of a method of testing the TAMH 20 above according to one embodiment of the present invention. The testing method is performed in individual slider-level, which includes the following steps at least:

S901, providing a slider body having a waveguide embedded therein with an incidence end extending toward a back surface of the slider body;

S902, providing a light source unit including a light source and a unit substrate for supporting the light source;

S903, coating a bonding material layer on the back surface, under the bottom, or both on the back surface and under the bottom of the unit substrate;

S904, coating a localization material layer on the back surface to cover the incidence end of the waveguide;

S905, aligning the light source unit to the slider body;

S906, causing a light emitted from the light source and allowed to be incident on the incidence end of the waveguide to anneal the localization material layer to generate an annealing mark;

S907, removing the light source unit or the light source from the slider body; and S908, measuring a position offset between the annealing mark of the localization material layer and the incidence end of the waveguide.

Preferably, the method further includes melting the bonding material layer and then bonding the slider body and the light source unit for better aligning.

During the process of manufacturing the TAMH 20, a position correction is made to the position between the light source unit and the slider body according to the position offset measured in the testing method.

Figure 10:
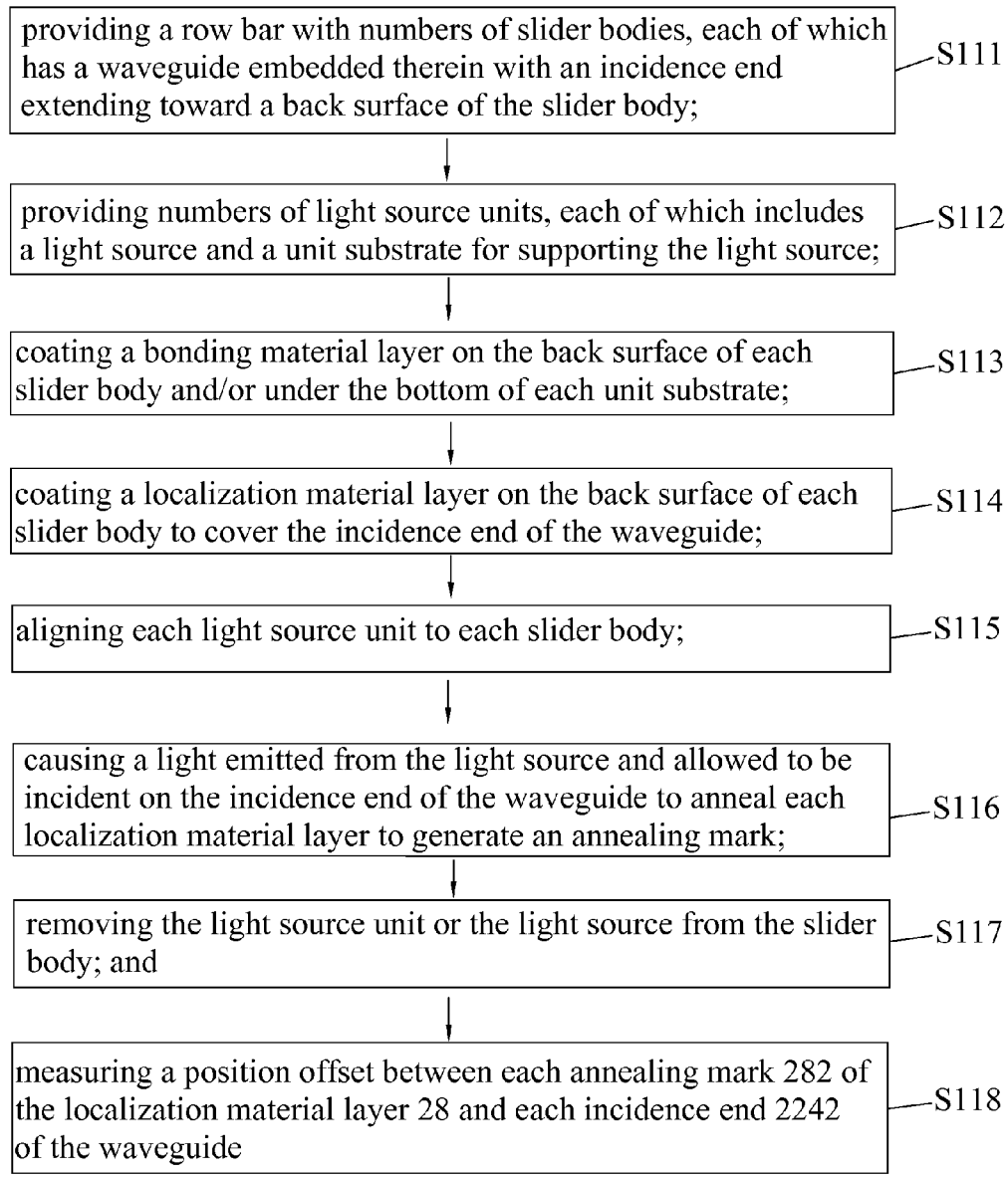
FIG. 10 is a flowchart of a method of testing a thermally-assisted magnetic head according to a second embodiment of the present invention.
Figure 11:
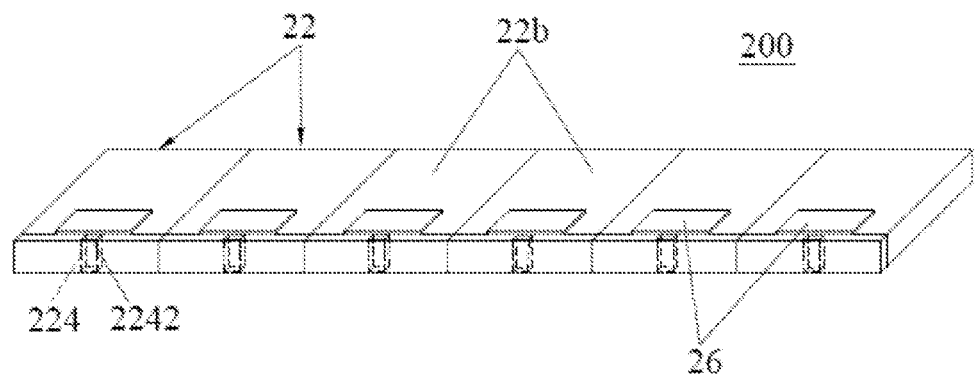
FIG. 11 is a perspective view depicting one step in a method of testing the thermally-assisted magnetic head as shown in FIG. 10.
Figure 12:
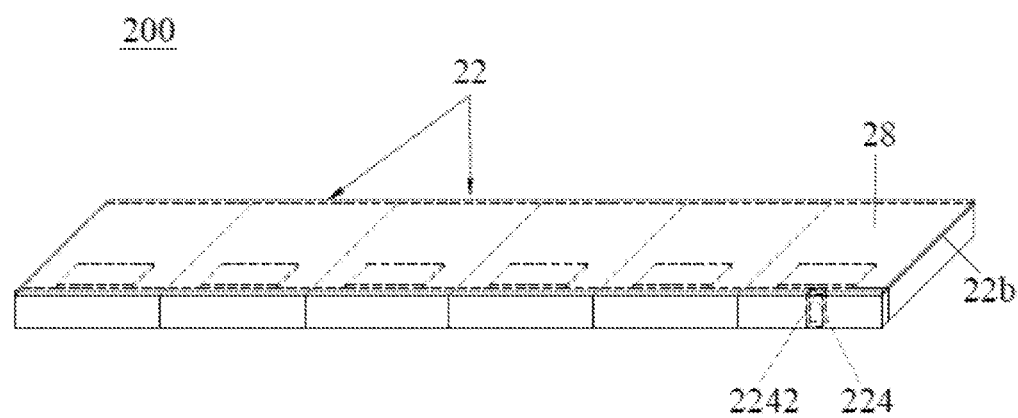
FIG. 12 is a perspective view depicting one step following FIG. 11
Figure 13:
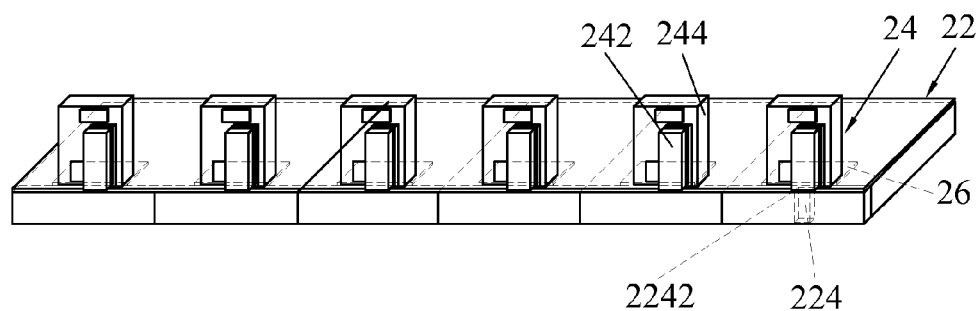
FIG. 13 is a perspective view depicting one step following FIG. 12.
Figure 14:
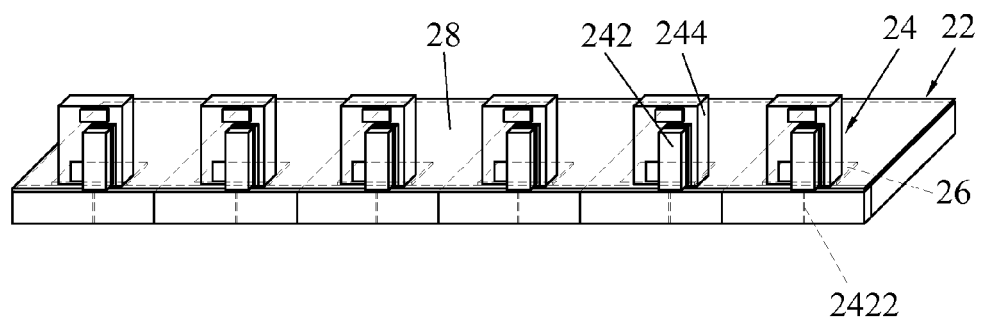
FIG. 14 is a perspective view depicting one step following FIG. 13.
Figure 15:
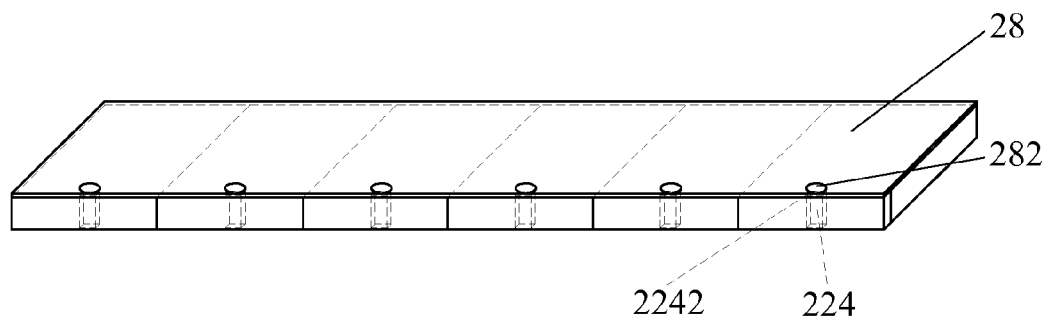
FIG. 15 is a perspective view depicting one step following FIG. 14.

FIG. 10 shows a simplified flowchart of a method of testing a thermally-assisted magnetic head according to a second embodiment of the present invention. The testing method of the present embodiment is performed in row bar level, which can improve producing yield. FIG. 11 to FIG. 17 are views depicting main steps in the method of testing the TAMH as mentioned in FIG. 10 respectively, and detailed descriptions of other steps mentioned in FIG. 10 are conventional and omitted here therefore. The method includes the following steps:

S111, referring to FIG. 11, providing a row bar 200 with numbers of slider bodies 22, each of which has a waveguide 224 embedded therein with an incidence end 2242 extending toward a back surface 22b of the slider body 22;

S112, referring to FIG. 13, providing numbers of light source units 24, each of which includes a light source 242 and a unit substrate 244 for supporting the light source 242; Preferably, the light source 242 is a laser diode or a light emitting diode;

S113, referring to FIG. 11, coating a bonding material layer 26 on the back surface 22b of each slider body 22 and/or under the bottom of each unit substrate 244; In this embodiment, the bonding material layer 26 is applied on the back surface 22b where the light source unit 24 will be positioned; Concretely, the bonding material layer 26 is made of a material selected from a group consisting of tin, tin alloy, indium, indium alloy, lead alloy and bismuth alloy;

S114, referring to FIG. 12, coating a localization material layer 28 on the back surface 22b of each slider body 22 to cover the incidence end 2242 of the waveguide 224; Concretely, the localization material layer 28 is made of a material selected from a group consisting of tin, tin alloy, indium, indium alloy, lead alloy and bismuth alloy; The thickness of the localization material layer 28 is in a range of 10 angstrom to 10000 angstrom, which is a thickness that a light 2422 emitted from the light source can pass through; Preferably, the localization material layer 28 covers the entire back surface 22b of the row bar 200 for easy operation;

S115, referring to FIG. 13 and FIG. 14, aligning each light source unit 24 to each slider body 22; Concretely, aligning the light source unit 24 to the slider body 22 in such a way that a light 2422 generated from the light source 242 can enter the incidence end 2242 of the waveguide 224 and the bonding material layer 26 is sandwiched between the unit substrate 244 and the slider body 22;

S116, causing a light 2422 emitted from the light source 242 and allowed to be incident on the incidence end 2242 of the waveguide 224 to anneal each localization material layer 28 to generate an annealing mark 282 on each slider body 22, referring to FIG. 15; Concretely, the bonding material layer 26 does not cover the incidence end 2242 of the waveguide 224; the light 2422 is generated from each light source 242 for annealing the localization material layer 28; Preferably, the light 2422 is generated by supplying a current to the light source unit 24 for at least 1 second, preferably in a range of 1 second to 1 minute, and the current is in a range of 10 milliamperes to 200 milliamperes, a temperature of the light 2422 can arrive to at least 200 degree centigrade;

S117, removing the light source unit 24 or the light source 242 from the slider body 22; and S118, referring to FIG. 15, measuring a position offset between each annealing mark 282 of the localization material layer 28 and each incidence end 2242 of the waveguide 224.

Figure 16:
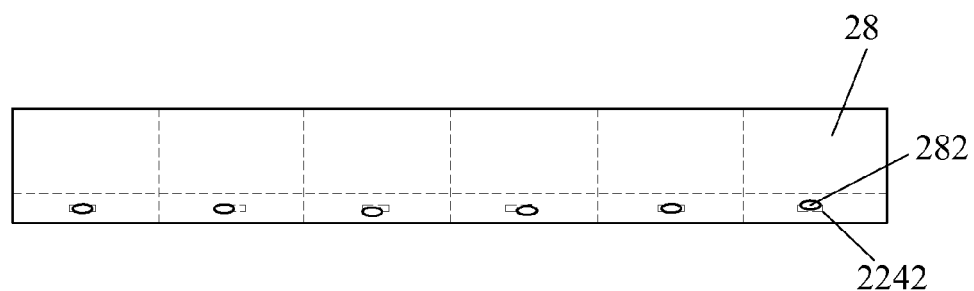
FIG. 16 is a top view of FIG. 15.
Figure 17:
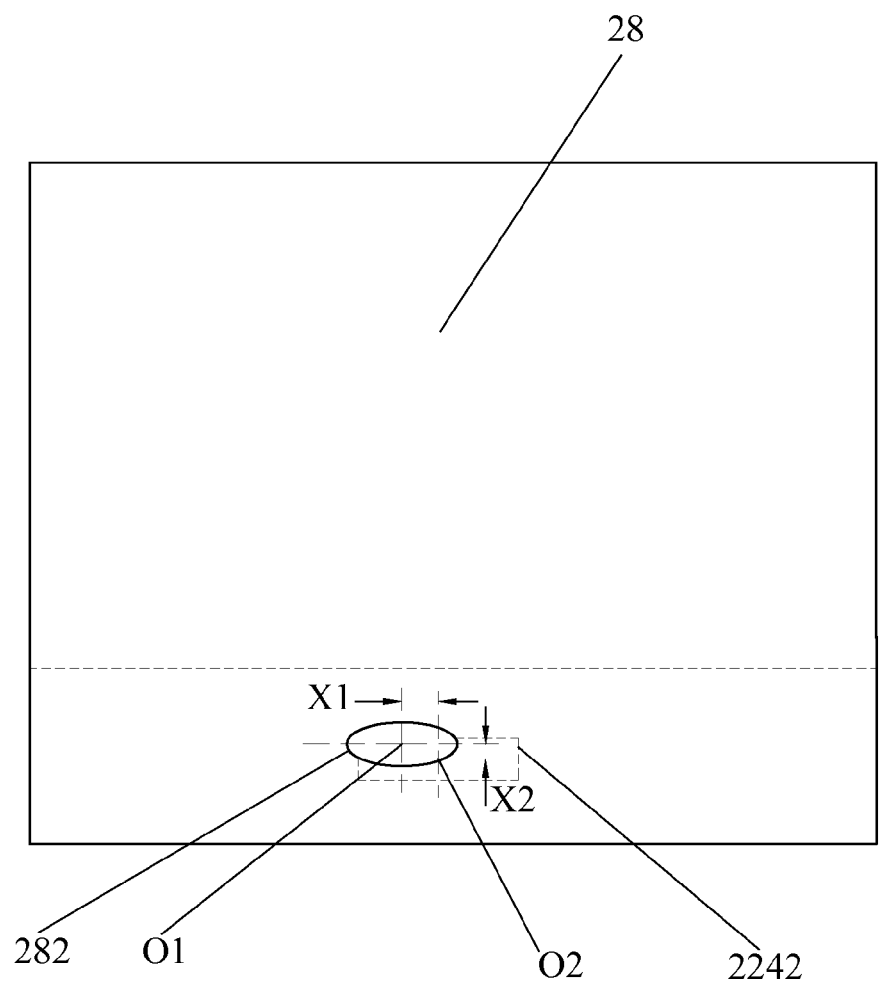
FIG. 17 is a schematic view of a slider body in FIG. 16.

During the process of manufacturing the TAMH 20 in row bar level, a position correction is made to the positions between each light source unit 24 and each slider body 22 according to the position offset measured in the testing method. Preferably, the method of removing the light source unit 24 or the light source 242 includes cutting, pulling, grinding, lapping or polishing, in this embodiment, the total light source unit 24 is removed;

Referring to FIGS. 16 and 17, an annealing mark 282 is remained after annealing each localization material layer 28, and the annealing mark 282 and incidence end 2242 of a waveguide 224 provide us the actual alignment position in two dimensional directions. Concretely, a center O1 of the annealing mark 282 and a center O2 of the incidence end 2242 can be located, and then a position offset X1 in horizontal direction and a position offset X2 in perpendicular direction all can be measured depending on the center O1 position of the annealing mark 282 and the center O2 position of the incidence end 2242. Thereby, a position correction can be made to the position between the light source unit 24 and the slider body 22 in two dimensional directions.

Selectively, the method further includes a step of melting the bonding material layers 26 and then bonding the slider bodies 22 and the light source units 24 after the step of aligning each light source unit 24 to each slider body 22. The unit substrates 244 are irradiated with heating laser lights or LED lights that are projected to pass through the unit substrates 244, so that the bonding material layers 26 interposed between the slider bodies 22 and the unit substrates 244 are heated and melted by the heating laser lights or LED lights. After that, the irradiations with the heating laser lights or LED lights are stopped to solidify the bonding material layers 26 to thereby allow the unit substrates 244 to be secured to the slider bodies 22.

In sum, the method coats a localization material layer 28 on the back surface 22b of a slider body 22 and then anneals the localization material layer 28 by a light source 242 to generate an annealing mark 282 on the localization material layer 28. In such a way, a position offset between each annealing mark 282 and each incidence end 2242 can be measured, whereby a position correction between the light source unit 24 and the slider body 22 in two dimensional directions can be made during the alignment process in the manufacturing method, and thus the alignment accuracy between the slider body 22 and the light source unit 24 can be improved, in turns the performance of the TAMH 20 is improved. In addition, the samples and machine used in testing method are easy to prepare, and the TAMH 20 can be tested in row bar level, thereby achieving a batch test to save the testing and measuring time.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method of testing a thermally-assisted magnetic head, the method comprising:
   providing a slider body having a waveguide embedded therein with an incidence end extending toward a back surface of the slider body;
   providing a light source unit including a light source and a unit substrate for supporting the light source;
   coating a bonding material layer on the back surface, under the bottom, or both on the back surface and under the bottom of the unit substrate;
   coating a localization material layer on the back surface to cover the incidence end of the waveguide;
   aligning the light source unit to the slider body;
   causing a light emitted from the light source and allowed to be incident on the incidence end of the waveguide to anneal the localization material layer to generate an annealing mark;
   removing the light source unit or the light source from the slider body; and
   measuring a position offset between the annealing mark of the localization material layer and the incidence end of the waveguide.

2. The method of testing a thermally-assisted magnetic head according to claim 1, wherein further comprises melting the bonding material layer and then bonding the slider body and the light source unit after aligning the light source unit to the slider body.

3. The method of testing a thermally-assisted magnetic head according to claim 1, wherein the bonding material layer is made of a material selected from a group consisting of tin, tin alloy, indium, indium alloy, lead alloy and bismuth alloy.

4. The method of testing a thermally-assisted magnetic head according to claim 1, wherein the localization material layer is made of a material selected from a group consisting of tin, tin alloy, indium, indium alloy, lead alloy and bismuth alloy.

5. The method of testing a thermally-assisted magnetic head according to claim 1, wherein the light source is a laser diode or a light emitting diode.

6. The method of testing a thermally-assisted magnetic head according to claim 1, wherein the method of removing the light source unit or the light source includes cutting, pulling, grinding, lapping or polishing.

7. The method of testing a thermally-assisted magnetic head according to claim 1, wherein the thickness of the localization material layer is in a range of 10 angstrom to 10000 angstrom.

8. The method of testing a thermally-assisted magnetic head according to claim 1, wherein the localization material layer covers the entire back surface of the slider body.

9. The method of testing a thermally-assisted magnetic head according to claim 1, wherein a current supplied to the light source unit for generating a light to anneal the localization material layer is in a range of 10 milliamperes to 200 milliamperes.

10. A method of manufacturing a thermally-assisted magnetic head, the method comprising the method of testing a thermally-assisted magnetic head according to claim 1 and making a position correction to the positions between the light source unit and the slider body according to the position offset.

\* \* \* \* \*